United States Patent [19]
Hanway

[11] 3,818,145
[45] June 18, 1974

[54] RADIO PAGING SYSTEM

[75] Inventor: John R. Hanway, Murrysville, Pa.

[73] Assignee: United Engineering Corporation, Fairmount, W. Va.

[22] Filed: July 19, 1972

[21] Appl. No.: 273,043

[52] U.S. Cl. .............................................. 179/41 A
[51] Int. Cl. .............................................. H04q 7/04
[58] Field of Search ............... 179/41 A; 325/55, 64

[56] References Cited

UNITED STATES PATENTS

| | | | |
|---|---|---|---|
| 3,542,968 | 11/1970 | Mercer | 179/41 |
| 3,575,558 | 4/1971 | Leyburn et al. | 179/41 A |
| 3,663,762 | 5/1972 | Joel, Jr. | 179/41 A |

*Primary Examiner*—Kathleen H. Claffy
*Assistant Examiner*—Thomas L. Kundert

[57] ABSTRACT

Direct-access paging system wherein a paging signal is originated by the person or caller who is making the page. A preassigned telephone number is called to connect the caller to the paging equipment. Additional push-buttons on the telephone are depressed according to a predetermined sequence to generate a coded input signal. The input signal is applied to decoding means which programs a paging encoder. When completely programmed, the paging encoder activates a radio transmitter which transmits the programmed paging signal. Similar paging systems may be interconnected by transmitting the coded input signal from one system to another.

6 Claims, 9 Drawing Figures

RADIO PAGING SYSTEM

BACKGROUND OF THE INVENTION

1. Field of the Invention

This invention relates, in general, to radio paging systems and, more specifically, to direct-access radio paging systems wherein the person making the page originates the paging signal.

2. Description of the Prior Art

Radio paging systems are used to contact a designated person within the range of an associated radio transmitter. The radio transmitter emits signals which are received by a paging receiver on or near the designated person. The paging receiver circuitry is activated by a predetermined sequence of signals, thus the designated person is alerted or paged. Upon being paged, the designated person follows his prearranged instructions, such as calling a specific telephone number or reporting to a specific location.

Present radio paging systems have effective ranges varying from the vacinity of a single building to a vast metropolitan area. The effective range of a radio paging system is dependent on many factors with one of the most determining factors being the distance between the radio transmitter and the paging receiver. To increase the reliable range of a radio paging system, it is possible to use more than one radio transmitter strategically located within the paging service area. With this arrangement, a paging receiver has a higher probability of being activated by a signal from one of the radio transmitters.

Systems herebefore known in the prior art using multiple radio transmitters have required eleborate and costly interconnecting arrangements to activate the transmitters. It is desirable, and it is an object of this invention, to provide a radio paging system using multiple transmitters which are inexpensively and effectively interconnected to increase the service range of the paging system.

Public radio paging systems have been used almost exclusively in large cities and metropolitan areas wherein a sufficient number of customers may be obtained to make the system profitable. In smaller cities and suburban areas, public radio paging systems have not become abundant. Even though a need exists for radio paging systems serving smaller communities, the economics of such systems have restricted the development thereof.

The very nature of paging systems and the people who use these systems make it highly desirable that paging coverage be provided in neighboring high-density population areas. Since a small city or community is usually geographically located substantially away from an adjacent city, a transmitter situated at a single location generally will not provide adequate paging coverage for both cities. A transmitter located in each city solves the radio signal coverage problem but does not generally provide an economical solution. Almost invariably, the transmitters will be located in different telephone exchanges. Thus, to have the transmitters interconnected for providing simultaneous paging by each, costly leased telephone lines or radio facilities must be used.

Therefore, it is also desirable, and it is another object of this invention, to provide a radio paging system which will permit economical interconnection between paging transmitters situated at different locations.

The economics of such small city paging systems is also adversely affected by the need for having personnel or operators on duty 24 hours a day to assist in originating a paging signal. It is also desirable, and it is a further object of this invention, to provide an economical paging system which allows the person making the page to originate his own paging signals without the assistance of a full-time operator.

SUMMARY OF THE INVENTION

There is disclosed herein new and useful radio paging systems wherein the paging signal is activated by the caller, or the person making the page. The page is initiated by calling a telephone number assigned to the paging system equipment location. Signal input means at the paging station answers the call and sends a signal to the caller to inform him to send a coded input signal, generally by pushing buttons on the telephone. The coded input signal is decoded by an input signal decoder which programs a paging encoder. When the paging encoder is properly programmed, control circuits, generally in the encoder, activate a transmitter which sends the proper paging signals to paging receivers which are located within the range of the transmitter.

A novel paging system is also disclosed wherein a plurality of substantially similar paging subsystems are effectively interconnected without the use of wire lines or additional radio transmitters or frequencies. An input signal originated in any subsystem is transmitted by the transmitter of that subsystem to receivers at each of the other subsystems. The input signal is applied to the signal decoders in each subsystem simultaneously. When each paging encoder is programmed by its signal decoder, the transmitter in each subsystem is activated to transmit the paging signal generated by its associated paging encoder.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
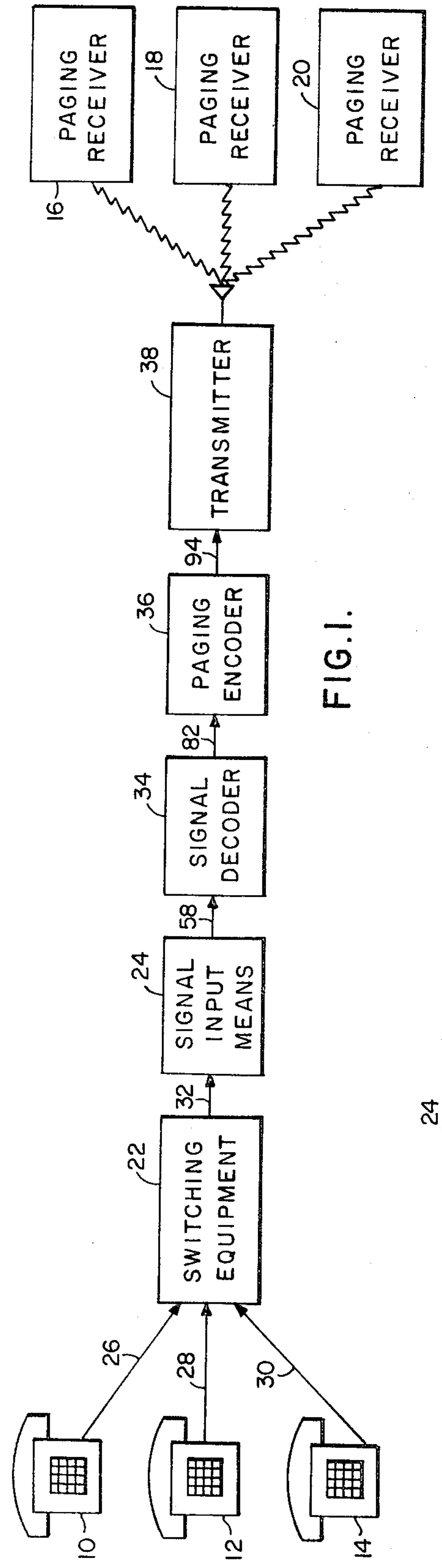
FIG. 1 is a schematic block diagram of a radio paging system constructed according to this invention.

Throughout the following description, similar reference characters refer to similar elements in all the figures of the drawing.

Referring now to the drawing, and FIG. 1 in particular, there is shown a schematic block diagram of a radio paging system constructed according to one embodiment of this invention. The push-button telephones 10, 12 and 14 provide means for generating an input signal. The input signal is generated by the person desiring to page one of the paging receivers 16, 18 or 20. In this embodiment, the input signal comprises audio frequency tones produced when buttons on one of the telephones are depressed. It is within the contemplation of this invention that other signal generating means may be used. A separate tone generator may be electrically or acoustically connected to a dial-type telephone to provide the proper input signal. An input signal comprising pulse coded tones may also be used.

The switching equipment 22 connects one of the telephones to the signal input means 24. The switching equipment 22 may be a central switching office for the telephone exchange in which the telephones 10, 12 and 14 are located. The switching equipment 22 may also be an extension telephone or PBX unit. Although only three telephones and three paging receivers are illustrated in this embodiment, it is within the contemplation of this invention that any number of telephones or receivers may be used.

A page is initiated from one of the telephones 10, 12 or 14. The telephone lines 26, 28 and 30 connect the telephones to the switching equipment 22. For descriptive purposes, it will be assumed that the page is being initiated at telephone 10, that telephone 10 is of the push-button type, and that the switching equipment 22 is a telephone central switching office.

The proper sequence of buttons is pushed on the telephone 10 to activate the switching equipment 22 and to connect the telephone line 26 to the telephone or transmission line 32. Normally, the proper push-button sequence would be produced by first pushing buttons corresponding to the seven digit telephone number assigned to the telephone line 32.

When the switching equipment 22 connects the telephone 10 to the telephone line 32, a ringing voltage is applied to the telephone line 32. The ringing voltage activates the signal input means 24. Upon detecting ringing voltage, the signal input means is connected to or "answers" the telephone line 32.

After the telephone line 32 is connected to the signal input means 24, additional buttons are pushed on the telephone 10 in a predetermined sequence. This provides an input signal comprising tone signals to the signal input means 24. The input signal is transferred to the signal decoder 34 which recognizes the sequence of the tones in the input signal.

The signal decoder 34 provides an output function corresponding to the input signal and the output function is applied to the paging encoder 36. The paging encoder has an input channel for each signal decoder output function. For example, if the telephone button numbered 3 is pushed to provide the input signal, the signal decoder 34 recognizes the input signal tones and provides an output function which activates the third input channel of the paging encoder 36.

After being programmed through an input channel, the paging encoder 36 provides a paging signal to the transmitter 38. The paging signal corresponds to the input channel which was programmed by the signal decoder 34.

The paging signal modulates or keys the transmitter 38 and the paging signal is detected by the paging receivers 16, 18 and 20. The paging receiver which includes detection circuitry which is responsive to the specific paging signal sequence which is transmitted is activated and completes the page by vibrating or "beeping."

Figure 2:
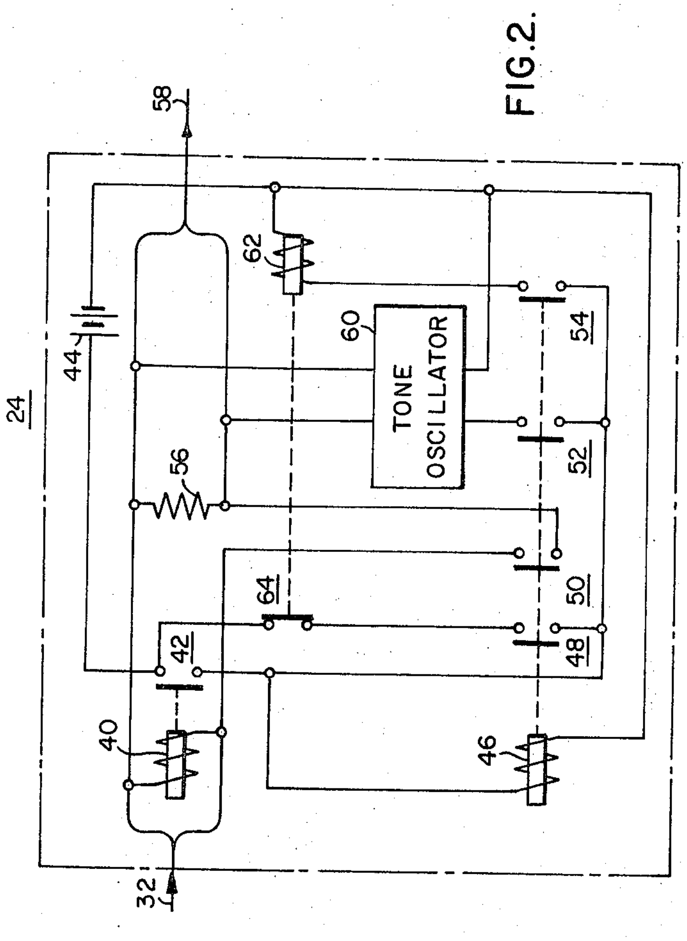
FIG. 2 is a schematic circuit diagram of a signal input means constructed according to this invention.

FIG. 2 is a schematic diagram of the signal input means 24 constructed according to this specific embodiment. Other circuit arrangements may be used without departing from the spirit of this invention. Relay 40 is energized by the ringing voltage provided by the transmission line 32. When relay 40 is energized, contacts 42 are closed and the voltage from battery 44 energizes relay 46. When relay 46 is energized, contacts 48, 50, 52 and 54 are closed. Contacts 48 form a holding circuit for the relay 46 and allows it to remain energized after the ringing voltage ceases.

Contacts 50 connect a relatively low impedance 56 across the transmission line 32 to cause the central switching office equipment 22 to respond to an "answered" call. Contacts 50 also connect the line 32 to the line 58 for proper transfer of the input signal. The tone oscillator 60 is activated by the contacts 52 and informs the caller when to activate the input signal, that is, when to push additional buttons on his telephone.

Time delay relay 62 is energized by the contacts 54 but contacts 64 do not open for the period of the delay. The time delay is sufficiently long enough to allow the person initiating the page to provide the input signal, but short enough to prevent unnecessarily long use of the telephone line 32. A sufficient time delay would be ten seconds. When contacts 64 are opened, relay 46 de-energizes and the signal input means 24 is ready for the next paging call.

Figure 3:
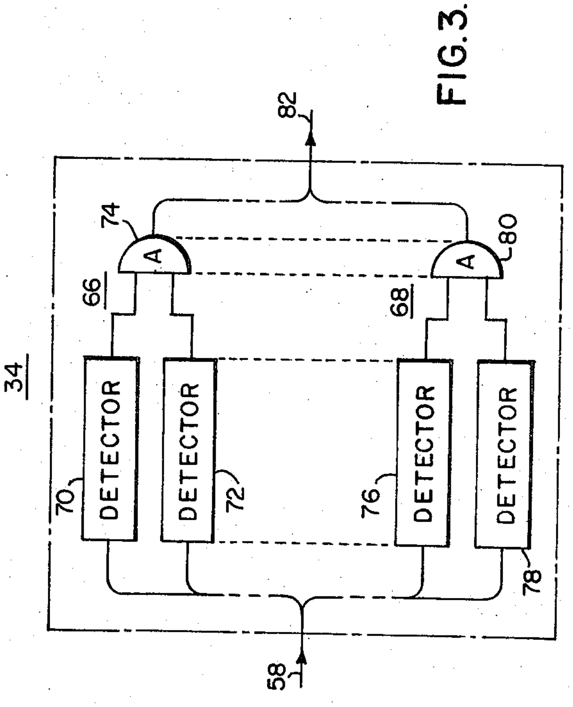
FIG. 3 is a partial schematic block diagram of a signal decoder constructed according to this invention.

FIG. 3 is a schematic block diagram of the signal decoder 34 constructed according to this specific embodiment. The input signal from the signal input means 24 consists of at least one pair of tone frequencies. The signal decoder 34 comprises a plurality of dual-frequency detectors, such as detectors 66 and 68. For the standard 12 button telephone, twelve dual-frequency detectors could be used.

Dual-frequency detector 66 includes the single frequency detectors 70 and 72 and the AND logic circuit 74. Dual-frequency detector 68 includes the single frequency detectors 76 and 78 and the AND logic circuit 80. The single frequency detectors 70, 72, 76 and 78 may comprise highly selectable electronic tuned circuits, resonant reed relays, or other suitable elements. Single frequency detectors tuned to the same frequency may be common elements. For example, with a "three by four" 12 button telephone, only seven single frequency detectors are required.

The input signal is applied to all of the dual-frequency detectors simultaneously. When the input signal contains both frequencies associated with a particular AND circuit, that AND circuit activates an output channel corresponding to that particular tone pair in the input signal. The number of output channels normally equals the number of dual-frequency detectors. For example, if the signal decoder 34 contained dual-frequency detectors corresponding to the numbers 0, 1, 2, 3, 4, 5, 6, 7, 8 and 9 on a telephone, ten output channels would be provided. The output channel noramally transfers electrical information from the signal decoder 34, that is, the output channel, when activated, may energize a relay in the paging encoder which is associated with this putput channel.

Figure 4:
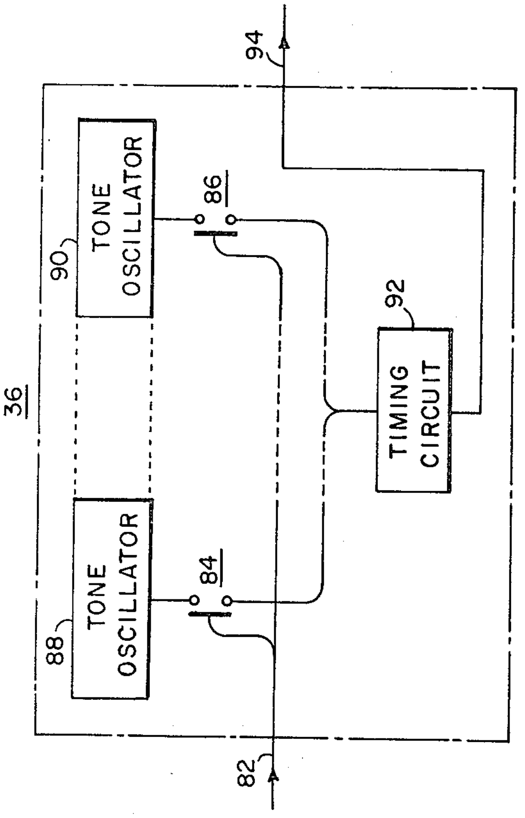
FIG. 4 is a partial schematic block diagram of a paging encoder constructed according to this invention.

FIG. 4 is a schematic block diagram of the paging encoder 36 constructed according to this specific embodiment. The output channels of the signal decoder 34 are transferred through the line 82 to corresponding encoder contacts, such as contacts 84 and 86. Each encoder contact is associated with a separate encoder input channel which corresponds to a separate decoder output channel. For example, the output from the dual-frequency detector 66 activates the contacts 84 and the output from the dual-frequency detector 68 activates the contacts 86.

The encoder contacts are associated with a specific tone oscillator, such as the oscillators 88 and 90. The timing circuit 92 controls the paging encoder operation after the encoder contacts have been set. The paging signal is derived from the proper tone oscillators and the proper sequence and timing is controlled by the timing circuit 92. The paging signal is transferred through the line 94 to the transmitter 38. Paging encoders are commercially available to provide this function of the invention. Also, transmitters and suitable paging receivers are readily available.

The most basic paging encoder 36 provides a single frequency paging signal to which the paging receiver responds. Another type of paging encoder 36 provides a paging signal having a plurality of sequential tones to which the paging receiver responds.

Figure 5:
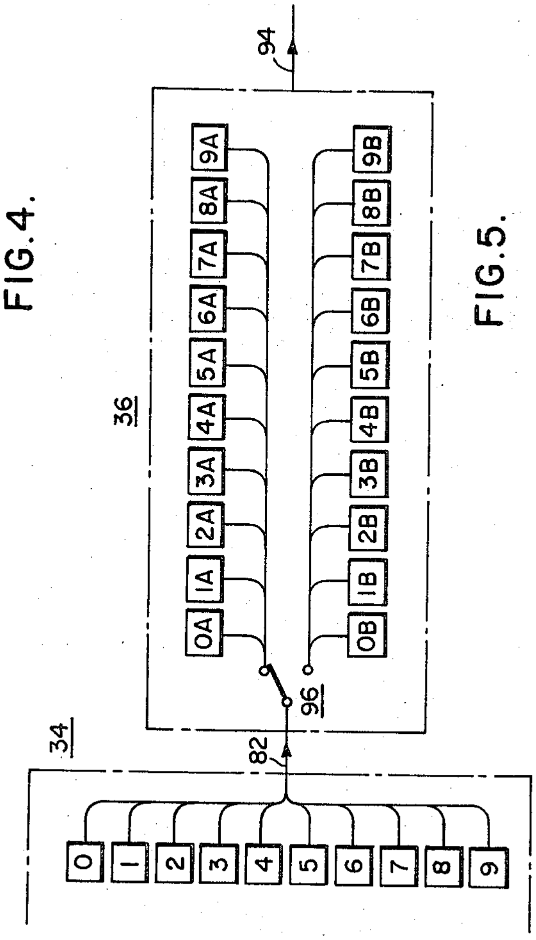
FIG. 5 is a partial schematic block diagram of a signal input means and a paging encoder constructed according to this invention.

A sequential paging encoder 36 contains more input channels. For example, as shown in FIG. 5, the encoder 36 may be constructed to provide two tone frequencies in the paging signal. With this arrangement, one hundred different paging signals can be provided. Switch 96 moves the decoder output channels between the two groups of input channels of the encoder 36.

As an example, it is desirable to provide a paging signal containing the frequency "1A" followed by the frequency "4B". The decoder has 10 output channels and the encoder has 20 input channels. The appropriate telephone button would be pushed to activate the 1 decoder output channel. This would activate the encoder input channel 1A. Next, the switch 96 automatically moves and the appropriate telephone button is pushed to activate the 4 decoder output channel. This would activate the encoder input channel 4B. Thus, the encoder 36 is programmed to provide a paging signal consisting of the frequencies 1A and 4B in sequence. The number of different paging signal frequencies and the number of sequential tones may be changed without departing from the spirit of this invention.

Figure 6:
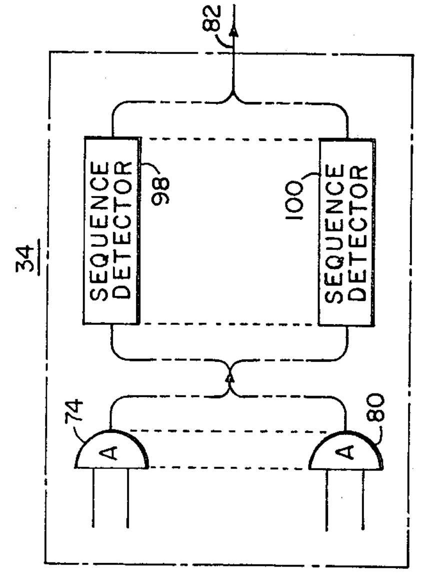
FIGS. 6 and 7 are block diagrams of a signal decoder constructed according to a specific embodiment of this invention.

To decrease the probability of making an unauthorized or unintentional page, a sequential detector may be used to provide the detector output channels. Referring to FIG. 6, the output channels from the AND elements 74 and 80 are applied to sequence detectors, such as sequence detectors 98 and 100. The sequence detectors require a predetermined sequence of tones in the input signal before activating a decoder output channel. The sequence detectors 98 and 100 function similar to the sequence detectors commercially available for other applications, such as in paging receivers.

Figure 7:
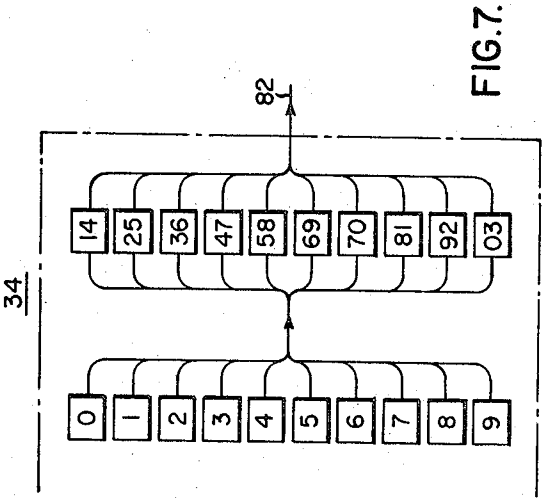

Although the arrangements are numerous, FIG. 7 shows one arrangement as an example. The decoder 34 has ten output channels and it is desirable to activate the decoder output channels 36 and 92. The appropriate telephone buttons are pushed to activate the 3 dual-frequency detector, the 6 dual-frequency detector, the 9 dual-frequency detector, and the 2 dual-frequency detector. Sequence detector 36 would be activated and then sequence detector 92 would be activated. With this arrangement, 99 different telephone button sequences are possible to provide only 10 output channels. Using the two-tone sequence arrangement just described for paging, 100 paging receivers can be paged by pushing four telephone buttons sequentially. Since 9,999 telephone button combinations are possible to page 100 receivers, the probability of unauthorized or unintentional pages is substantially reduced by the use of sequential detectors. The number of sequence detectors, dual-frequency detectors, sequence detector codes, etc., may be changed without departing from the spirit of this invention.

Figure 8:
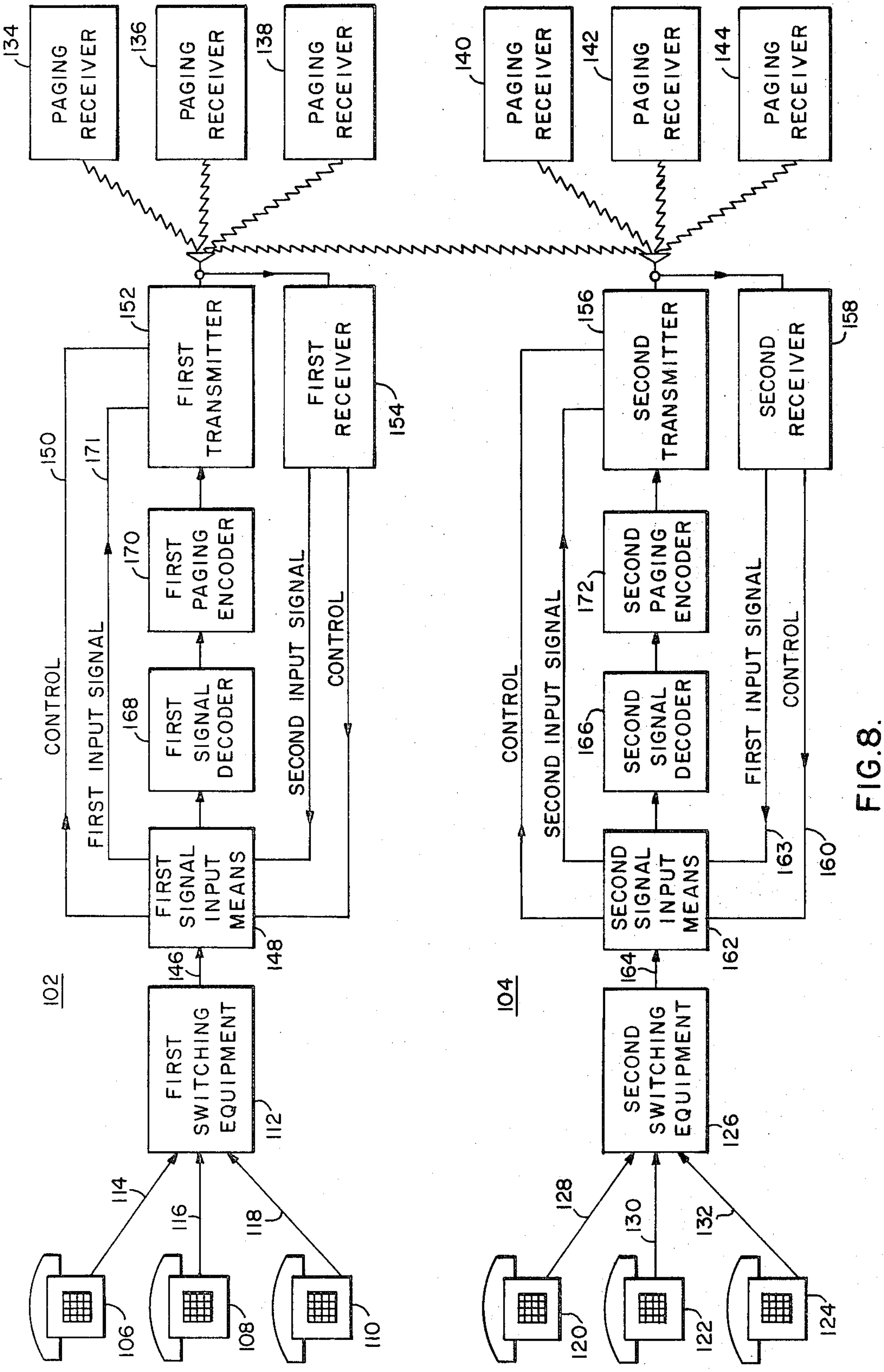
FIG. 8 is a schematic block diagram of an interconnected radio paging system constructed according to this invention.

The paging system described thus far provides automatic control of a single transmitter or a plurality of transmitters interconnected by conventional means. FIG. 8 is a block diagram of a radio paging system utilizing a new and useful arrangement of transmitter interconnecting. For purposes of this description only, the paging subsystems 102 and 104 will be described as being located in different telephone exchanges. It is within the contemplation of this invention that the paging subsystems 102 and 104 may be in the same telephone exchange, the same building, or in any other relative location.

Telephones 106, 108 and 110 are connected to the first switching equipment 112 by the telephone lines 114, 116 and 118, respectively. The first switching equipment is assumed to be a telephone central office in a first telephone exchange. Telephones 120, 122 and 124 are connected to the second switching equipment 126 by the telephone lines 128, 130 and 132, respectively. The second switching equipment is also assumed to be a telephone central office in a second telephone exchange.

The paging receivers 134, 136 and 138 are associated with the first paging subsystem 102. The paging receivers 140, 142 and 144 are associated with the second paging subsystem 104. Although the paging receivers may be associated mainly with one paging subsystem, it is emphasized that a paging receiver from one paging subsystem may be activated by the signals transmitted from the other paging subsystem.

The operation of the paging subsystems 102 and 104 is similar to the operation of the paging system described in connection with FIG. 1. For purposes of this specific description only, it will be assumed that the paging receiver 138 is to be activated by the telephone 108. A seven digit number is sent by telephone 108 by pushing the proper sequence of buttons. The first switching equipment 112, which in this embodiment is a telephone central office, connects the telephone 108 to the telephone line 146 which has been assigned the seven digit number sent by the telephone 108.

A ringing voltage is applied to the first input signal means 148 which "answers" the incoming "call." Upon answering the call, the first input signal means 148 immediately activates the control channel 150 which turns on the first transmitter 152. The first transmitter 152, the first receiver 154, the second transmitter 156, and the second receiver 158 all function on the same carrier frequency. Thus, when the first transmitter 152 is turned on, its carrier signal is detected by the second receiver 158. Sub-audible tones or other arrangements may be used to prevent unauthorized transmitters from activating the receiver 158. When the proper signal is detected by the receiver 158, the control channel 160 is activated and signals transmitted by the first transmitter 152 are applied to the second input signal means 162 through channel 163. The control channel 160, when activated, prevents the second input signal means 162 from answering a call from the line 164 and transfers the first input signal from channel 163 to the second signal decoder 166.

After answering the call from line 146 and instantaneously activating the other elements of the paging system as just described, additional buttons on the telephone 108 are pushed to generate the first input signal. The first input signal is transferred to the first signal decoder 168. At the same time, the first input signal is transferred through channel 171, the first transmitter 152, the second receiver 158, the signal channel 163, and the second input signal means 162 to the second signal decoder 166.

The first input signal is decoded and processed by the first signal decoder 168 and by the second signal decoder 166 as described herein concerning FIG. 1. The decoded first input signal properly programs the first and second paging encoders 170 and 172. When properly programmed, the paging encoders send out the same paging signal from its associated transmitter. Thus, paging receiver 138 is activated by the signal from the first transmitter 152. It is emphasized that if the paging receiver 138 was located in the vacinity of the second transmitter 156, the paging signal would be received from the second transmitter 156.

The first paging encoder 170 and the second paging encoder 172 may be constructed to activate their respective transmitters at slightly different times to prevent interference from simultaneously transmitted paging signals. It is important that the paging receivers are not responsive to the tone frequencies generated by the telephones. It is emphasized that the second receiver 158 has received all of the intelligence needed to provide the proper paging signal before the second transmitter 156 is turned on and, by necessity, the second receiver 158 is turned off.

The paging subsystem 102 and the paging subsystem 104 are substantially identical. Thus, a page can be initiated from either and page any paging receiver within the range of either transmitter.

Numerous other embodiments, such as sequential input signal decoding, may be used in each paging subsystem as described herein. Also, additional paging subsystems may be interconnected in this manner. When any one paging subsystem is initiating the page, a page cannot be initiated by any other paging subsystem. Use of the same paging and interconnecting frequencies conveniently conserves radio frequency spectrum and allows an increased range.

Figure 9:
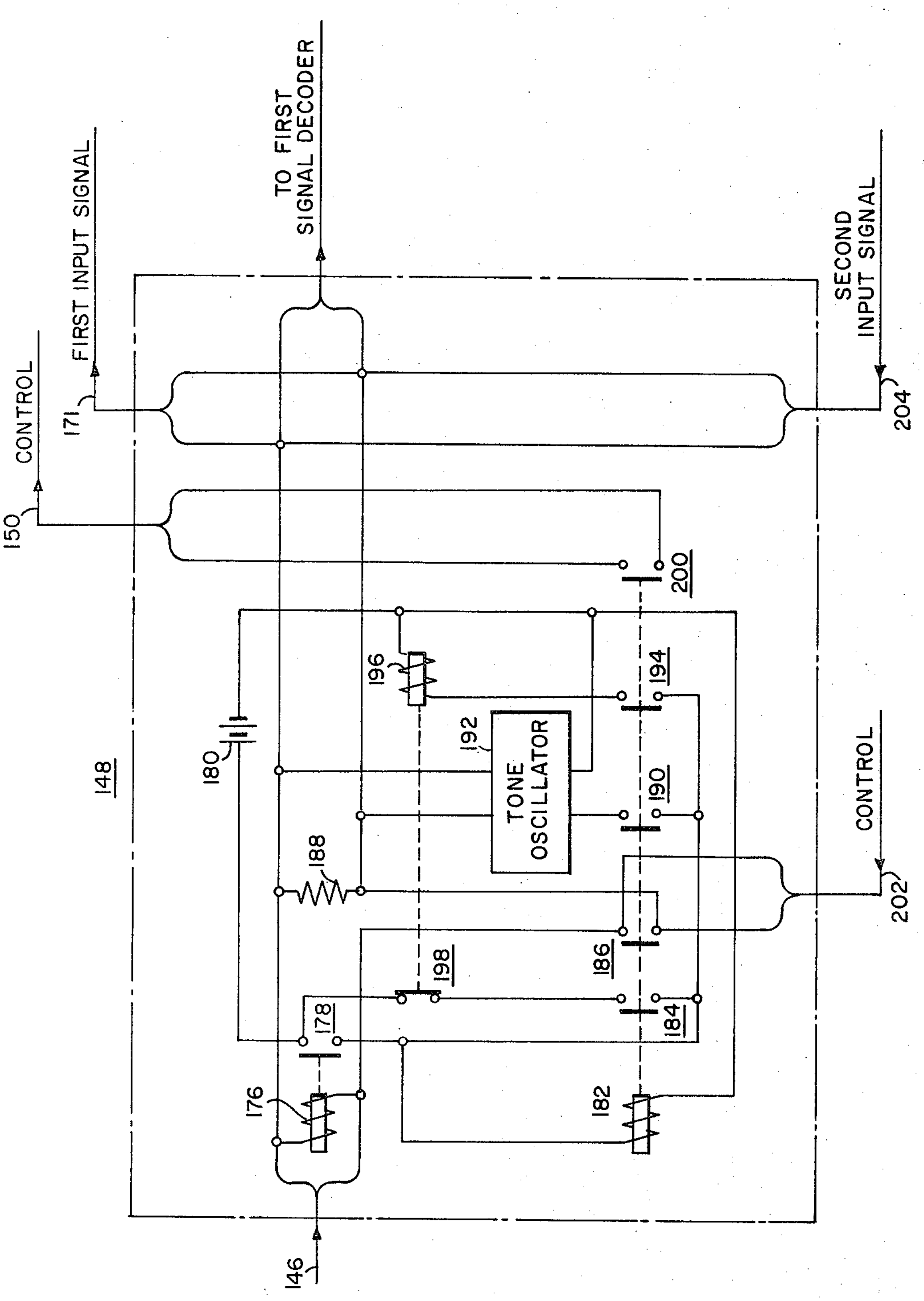
FIG. 9 is a schematic circuit diagram of a signal input means constructed according to a specific embodiment of this invention.

FIG. 9 illustrates a circuit arrangement for the first input signal means 148. The ringing voltage is applied to the relay 176 and the contacts 178 are closed to apply voltage from battery 180 to the relay 182. When relay 182 is energized, the contacts 184 are closed to form a holding circuit around the contacts 178. Contacts 186 close and apply the impedance 188 across the line 146 to "answer" the call. Contacts 190 close to activate the tone oscillator 192 which signals the caller to push the proper paging number to produce the first input signal. Contacts 194 are closed to energize the time delay relay 196. After a predetermined length of time, contacts 198 open to break the holding circuit and effectively remove the impedance 188 from across the line 146.

Contacts 200 are closed substantially instantaneously with the receiving of the ringing voltage. This activates the control channel 150 which turns on the first transmitter so that the first input signal from channel 171 may be transmitted to the second receiver of the associated paging subsystem. The first input signal is also applied to the first signal decoder 168.

If a page was initiated in the second paging subsystem, the first receiver would be activated. When the first receiver is activated, the control channel 202 connects the impedance across the line to provide a busy signal for anyone attempting to activate a page in the first paging subsystem. An alternate arrangement would be to disconnect the relay 176 from the line 146 when the control channel 202 is activated. Activation of the control channel 202 may be produced by the squelch circuitry of the first receiver and appropriate relay contacts. The second input signal is transferred over channel 204 from the first receiver to the first signal decoder 168.

Since numerous changes may be made in the above described systems and different embodiments of the invention may be made without departing from the spirit thereof, it is intended that all of the matter contained in the foregoing description, or shown in the accompanying drawing, shall be interpreted as illustrative rather than limiting.

I claim as my invention:

1. Radio paging apparatus comprising signal input means, input signal decoding means, and paging encoding means, said signal input means being connectable to a transmission line, said signal input means being suitable for transferring first and second sequences of dual-frequency tones from said transmission line to said input signal decoding means, said input signal decoding means comprising sequence detectors responsive to predetermined sequences of specific dual-frequency tones, said sequence detectors providing a first output when said first sequence of dual-frequency tones contains predetermined dual-frequencies in proper sequence, said sequence detectors providing a second output when said second sequence of dual-frequency tones contains predetermined dual-frequencies in proper sequence, said first output programming said paging encoding means to produce a first paging tone, said second output programming said paging encoding means to produce a second paging tone, said first and second paging tones comprising a paging signal being suitable for transmission by transmitting means to receiving means responsive to said paging signal.

2. An interconnected radio paging system comprising first and second signal input means, first and second input signal decoders, first and second paging encoders, first and second transmitters, said first signal input means being connected to a first transmission line, said first signal input means adapted for transferring first input signals from said first transmission line to said first input signal decoder, said first input signal decoder being responsive to predetermined input signals from said first signal input means, the response from said first input signal decoder programming said first paging encoder, said first paging encoder providing first paging signals which are transmitted by electromagnetic radiation by said first transmitter, said second signal input means being connected to a second transmission line, said second signal input means adapted for transferring second input signals from said second transmission line to said second input signal decoder, said second input signal decoder being responsive to predetermined input signals from said second signal input means, the response from said second input signal decoder programming said second paging encoder, said second paging encoder providing second paging signals which are transmitted by electromagnetic radiation by said second transmitter, a second receiver associated with said second transmitter, said first signal input means transferring the first input signal to the first transmitter, the first input signal being transmitted by said first transmitter to said second receiver, and said second receiver transferring said first input signal to said second signal input means where it is transferred to said second input signal decoder.

3. The interconnected radio paging system of claim 2 wherein the second signal input means functions, when the first input signal is derived from the second receiver, to prevent a second input signal to be received from the second transmission line and to prevent the first input signal from being transmitted by the second transmitter.

4. The interconnected radio paging system of claim 2 wherein the first transmitter operates on the same carrier frequency as the second transmitter.

5. An interconnected radio paging system comprising first and second signal input means, first and second input signal decoders, first and second paging encoders, first and second transmitters, said first signal input means being connected to a first transmission line, said first signal input means adapted for transferring first input signals from said first transmission line to said first input signal decoder, said first input signal decoder being responsive to predetermined input signals from said first signal input means, the response from said first input signal decoder programming said first paging encoder, said first paging encoder providing first paging signals which are transmitted by electromagnetic radiation by said first transmitter, a second receiver associated with the second transmitter, said first signal input means transferring the first input signal to said first transmitter, the first input signal being transmitted by said first transmitter to said second receiver, said second receiver transferring said first input signal to said second signal input means where it is transferred to said second input signal decoder, said second input signal decoder being responsive to predetermined input signals from said second signal input means, the response from said second input signal decoder programming said second paging encoder, said second paging encoder providing second paging signals which are transmitted by electromagnetic radiation by said second transmitter, said first and second transmitters operating on the same carrier frequency.

6. An interconnected radio paging system comprising at least first and second paging subsystems, means in said first paging subsystem for transmitting paging signals which are responsive to input signals received by said first paging subsystem from a first telephone line, means in said second paging subsystem for transmitting paging signals which are responsive to input signals received by said second paging subsystem from a second telephone line, said first paging subsystem also transmitting paging signals which are responsive to input signals received by said second paging subsystem from the second telephone line, said second paging subsystem also transmitting paging signals which are responsive to input signals received by said first paging subsystem from the first telephone line, the paging signals from said first and second paging subsystems being transmitted on substantially the same carrier frequency, the input signals being transferred from one paging subsystem to the other paging subsystem on said same carrier frequency, and means for delaying the transmission of the paging signals in each of said paging subsystems until the input signal from the other paging subsystem has been received.

* * * * *